US006529123B1

(12) United States Patent
Paul, Jr.

(10) Patent No.: US 6,529,123 B1
(45) Date of Patent: Mar. 4, 2003

(54) AUTOMATICALLY DEPLOYABLE AND STOWABLE DISPLAY MONITOR

(75) Inventor: Charles A. Paul, Jr., Veneta, OR (US)

(73) Assignee: Rosen Products LLC, Eugene, OR (US)

( * ) Notice: Subject to any disclaimer, the term of this patent is extended or adjusted under 35 U.S.C. 154(b) by 0 days.

(21) Appl. No.: 09/705,597

(22) Filed: Nov. 2, 2000

Related U.S. Application Data

(60) Provisional application No. 60/163,099, filed on Nov. 2, 1999.

(51) Int. Cl.[7] .................................................. B60Q 1/00
(52) U.S. Cl. ..................... 340/425.5; 340/459; 340/461; 340/517
(58) Field of Search ............................... 340/425.5, 428, 340/815.4, 990, 995, 459, 10.6, 525, 461, 462, 815.58; 348/837; 349/58; 284/919, 920, 921, 924; 180/167

(56) References Cited

U.S. PATENT DOCUMENTS

| 4,555,690 | A | * | 11/1985 | Fukushima et al. ......... 340/329 |
| RE33,112 | E | * | 11/1989 | Durham ..................... 296/37.7 |
| 5,096,271 | A | * | 3/1992 | Portman ..................... 312/7.2 |
| 5,677,664 | A | * | 10/1997 | Sawinski ..................... 340/426 |
| 5,796,176 | A | * | 8/1998 | Kramer et al. .............. 307/10.1 |
| 5,850,215 | A | * | 12/1998 | Kamiya et al. .............. 345/204 |
| 6,115,086 | A | * | 9/2000 | Rosen ......................... 296/37.7 |
| 6,227,601 | B1 | * | 5/2001 | LaFrance ................. 296/97.11 |
| 6,256,078 | B1 | * | 7/2001 | Ogata ........................... 349/58 |

* cited by examiner

Primary Examiner—Daniel J. Wu
Assistant Examiner—Son Tang
(74) Attorney, Agent, or Firm—Kolisch Hartwell, P.C.

(57) ABSTRACT

A display monitor system for mounting in an automobile, the automobile having an interior and a vehicle status indicator with a changeable state, is provided. The display monitor system comprises a monitor, a motor drivingly coupled to the monitor, and a controller operatively connected to the motor for controlling the motor. The monitor has a screen with a viewing surface, and is configured to be movably coupled to the interior of the automobile such that it is movable between a deployed position, in which the viewing surface is visible to the viewer, and a stowed position. The motor is drivingly coupled to the monitor to move the monitor between the stowed position and the deployed position. The controller is adapted to detect a change in the state of the vehicle status indicator and to signal the motor to move the monitor to a predetermined position corresponding to the detected change in the state.

23 Claims, 4 Drawing Sheets

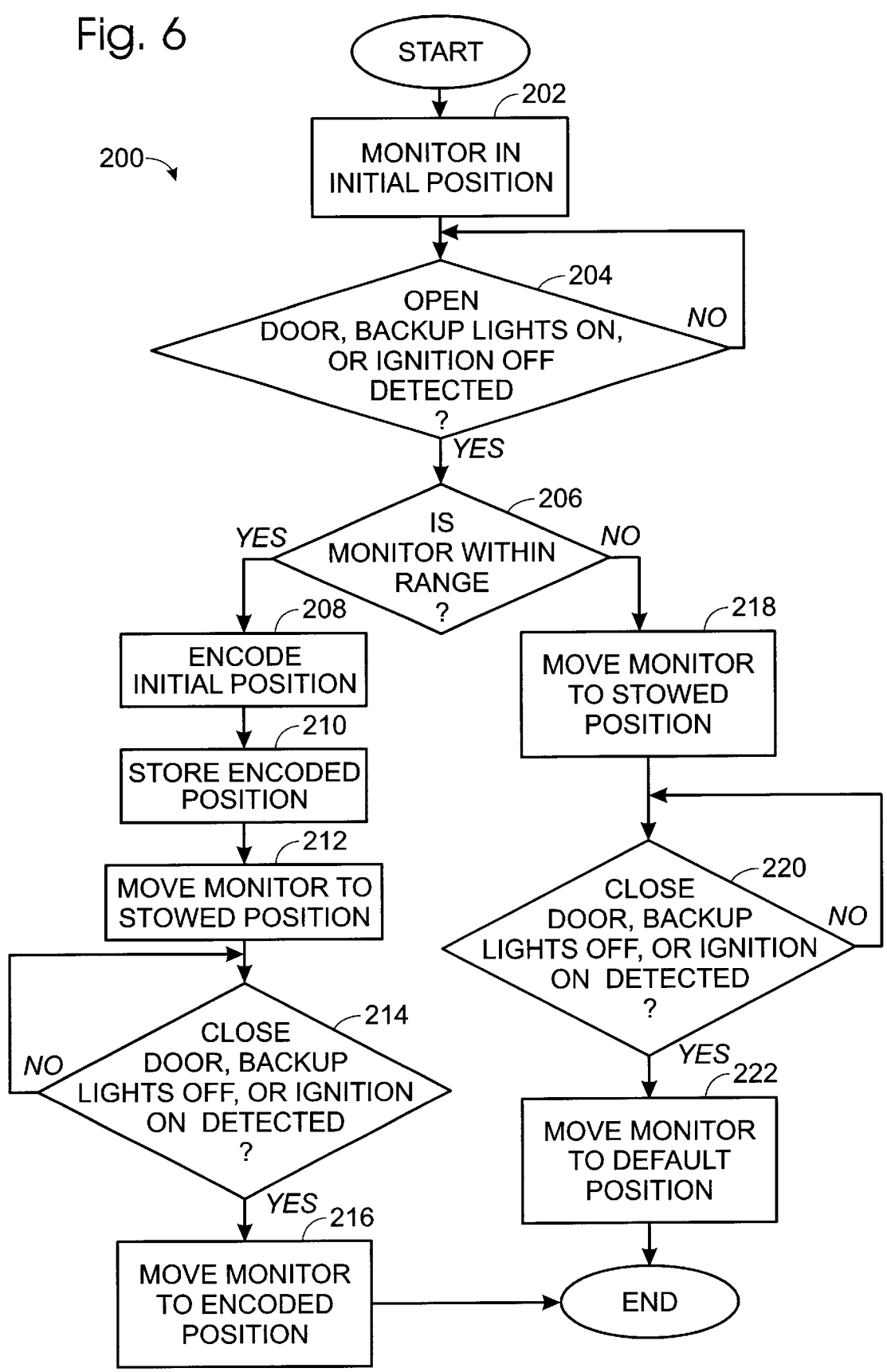

AUTOMATICALLY DEPLOYABLE AND STOWABLE DISPLAY MONITOR

CROSS-REFERENCE TO RELATED APPLICATION

This application claims priority from U.S. Provisional Patent Application Serial No. 60/163,099, filed Nov. 2, 1999 for an AUTOMATICALLY DEPLOYABLE AND STOWABLE DISPLAY UNIT.

TECHNICAL FIELD

The present invention relates generally to display monitors for passenger vehicles, and more particularly to a display monitor system with a monitor that is automatically deployed or stowed upon the occurrence of a predetermined status change within a vehicle.

BACKGROUND

Display monitors systems have become popular accessories in passenger vehicles, and find a wide variety of applications in various vehicular systems. For example, a display monitor system may be used in a vehicle as a computer monitor, a navigation display, a closed-caption display for an external camera, etc. Flat panel display (FPD) monitor systems have become particularly popular in vehicular entertainment systems for such uses as a television, video game monitor or video cassette player monitor.

A display monitor system may be mounted in a variety of locations within a passenger compartment of a vehicle, depending upon the type of vehicle and the intended use of the system. For example, in a passenger automobile, a display monitor system for use as a rear seat passenger entertainment system display may be mounted to the ceiling of the passenger compartment of the vehicle at a location between the front and rear seats so that it is viewable by rear seat passengers.

Ceiling-mounted display monitor systems typically include a monitor that extends into the passenger compartment of a vehicle, often from a central region of the vehicle ceiling. Unfortunately, ceiling-mounted display monitor systems may potentially interfere with the ordinary use of the vehicle. For example, the monitor may partially obscure a driver's rearward view when the driver is operating the vehicle in reverse. Similarly, the monitor may be a hindrance for a passenger getting into or out of the rear seat of the vehicle. For this reason, many display monitor systems include a monitor that is movable between a deployed position, in which the monitor is positioned for viewing by a vehicle occupant, and a stowed position, in which the monitor is positioned to lessen interference with the ordinary use of the vehicle.

Although stowable monitors offer safety benefits over fixed-position monitors, occupants of the vehicle may sometimes find stowing the monitor to be an inconvenience. For example, a driver wanting to use the automobile in reverse may need to get into the passenger compartment of the automobile to stow the monitor before backing up. Also, vehicle occupants may forget or neglect to stow the monitor when the automobile is not in use, which may make the monitor more susceptible to damage while performing activities such as loading or unloading a vehicle. Furthermore, it may be inconvenient for passengers getting into the automobile to first reach in and stow the monitor. In each of these situations, vehicle users may neglect to stow the monitor and thus not realize the safety benefits provided by the stowability. Therefore, it would be desirable to have a display monitor system with a stowable monitor that provides for the improved safety and convenience of vehicle occupants.

SUMMARY OF THE INVENTION

The present invention provides a display monitor system for mounting in an automobile, the automobile having an interior and a vehicle status indicator with a changeable state that. The display monitor system comprises a monitor, a motor drivingly coupled to the monitor, and a controller operatively connected to the motor for controlling the motor. The monitor has a viewing surface, and is configured to be movably coupled to the interior of the automobile such that the monitor is movable between a deployed position, in which the viewing surface is visible to the viewer, and a stowed position. The motor is drivingly coupled to the monitor to move the monitor between the stowed position and the deployed position. The controller is adapted to detect a change in the state of the vehicle status indicator and to signal the motor to move the monitor to a predetermined position corresponding to the detected change in the state. Alternatively, the controller may be adapted to itself detect a status of a vehicle component, and to move the monitor accordingly.

BRIEF DESCRIPTION OF THE DRAWINGS

FIG. 6 is a flow diagram of an embodiment of a method of automatically stowing a display monitor according to an embodiment of the present invention.

DETAILED DESCRIPTION OF THE PREFERRED EMBODIMENTS

The present invention provides a vehicular display monitor system for a passenger vehicle in which a monitor is automatically deployed or stowed upon detecting certain predetermined status changes in a vehicle. A display monitor system according to the present invention is indicated generally at 10 in FIGS. 1–3.

System 10 includes a monitor 12 that is movably coupled to a base 14. Base 14 is configured to be mountable to a vehicle 16 within the vehicle passenger compartment 18. Monitor 12 is movably coupled to base 14 such that it may be moved between a deployed position (FIG. 3), in which the monitor is viewable by vehicle passengers, and a stowed position (FIG. 2), in which the monitor interferes less with the use of the vehicle by a vehicle occupant.

Figure 1:
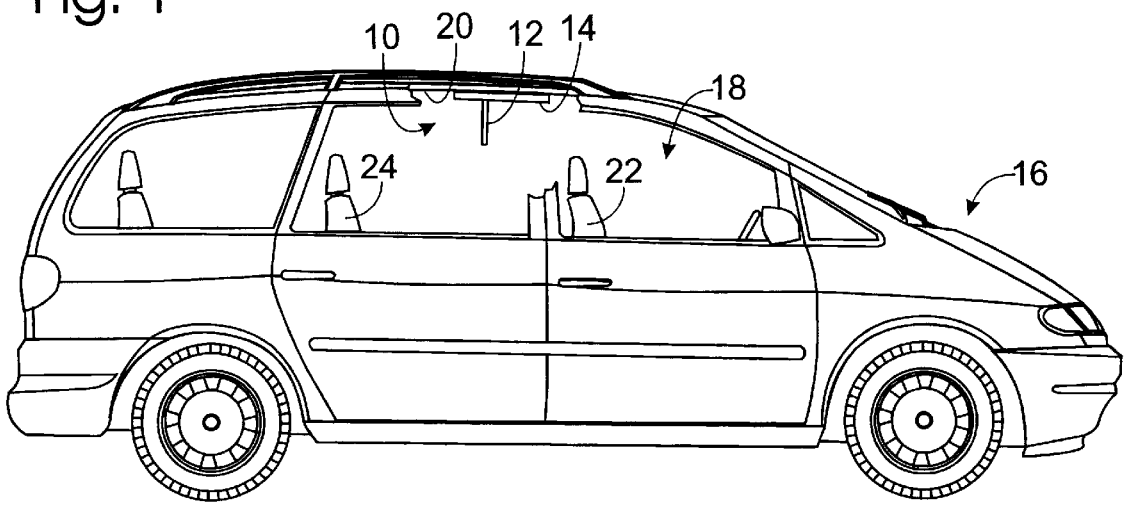
FIG. 1 is a partially fragmented side view of a passenger automobile with an embodiment of a display monitor system according to the present invention mounted to the ceiling of the passenger compartment of the automobile.

In the embodiment depicted in FIG. 1, display monitor system 10 is installed in a passenger vehicle 16, which takes the form of a van. However, it will be appreciated that system 10 may be installed in any type of passenger vehicle including a car, truck, motor home, etc. Additionally, while system 10 is shown mounted to ceiling 20 of passenger compartment 18, between driver's seat 22 and a first row of rear seats 24 for viewing by rear passengers, it will be understood that system 10 may be installed at any desired location in the passenger compartment for viewing by any or all of the occupants. It will also be understood that monitor 12 may be movably coupled directly to the vehicle ceiling without the use of base 14.

Figure 2:
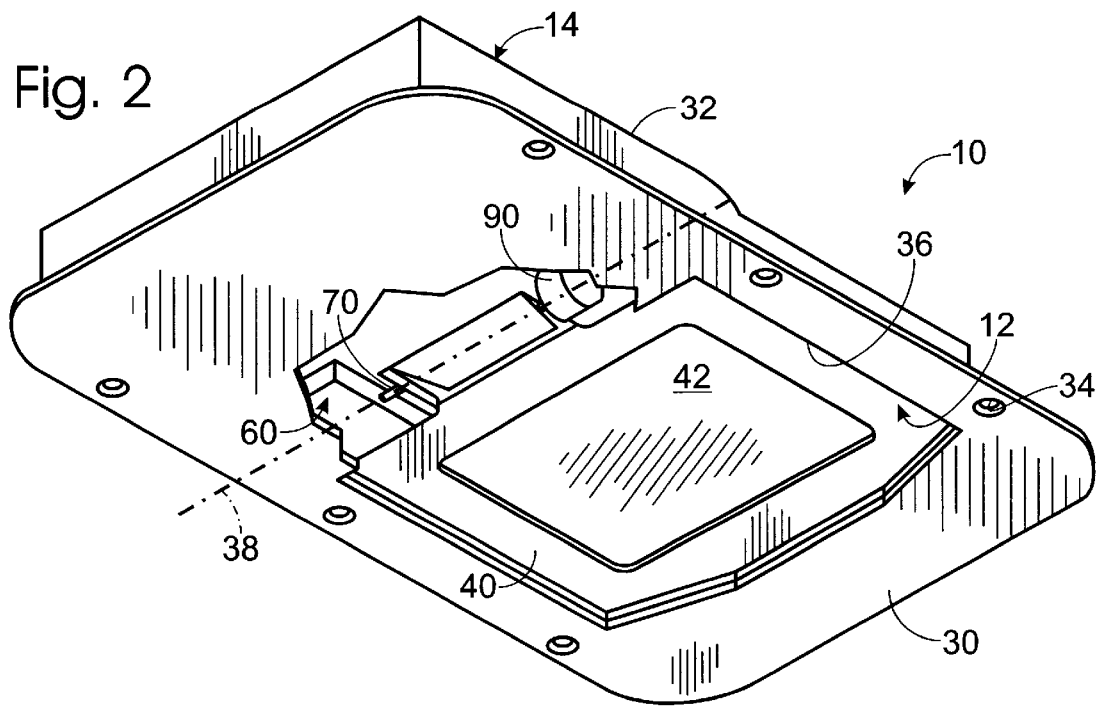
FIG. 2 is a partially fragmented isometric view of the embodiment of FIG. 1 with the monitor in the stowed position.
Figure 3:
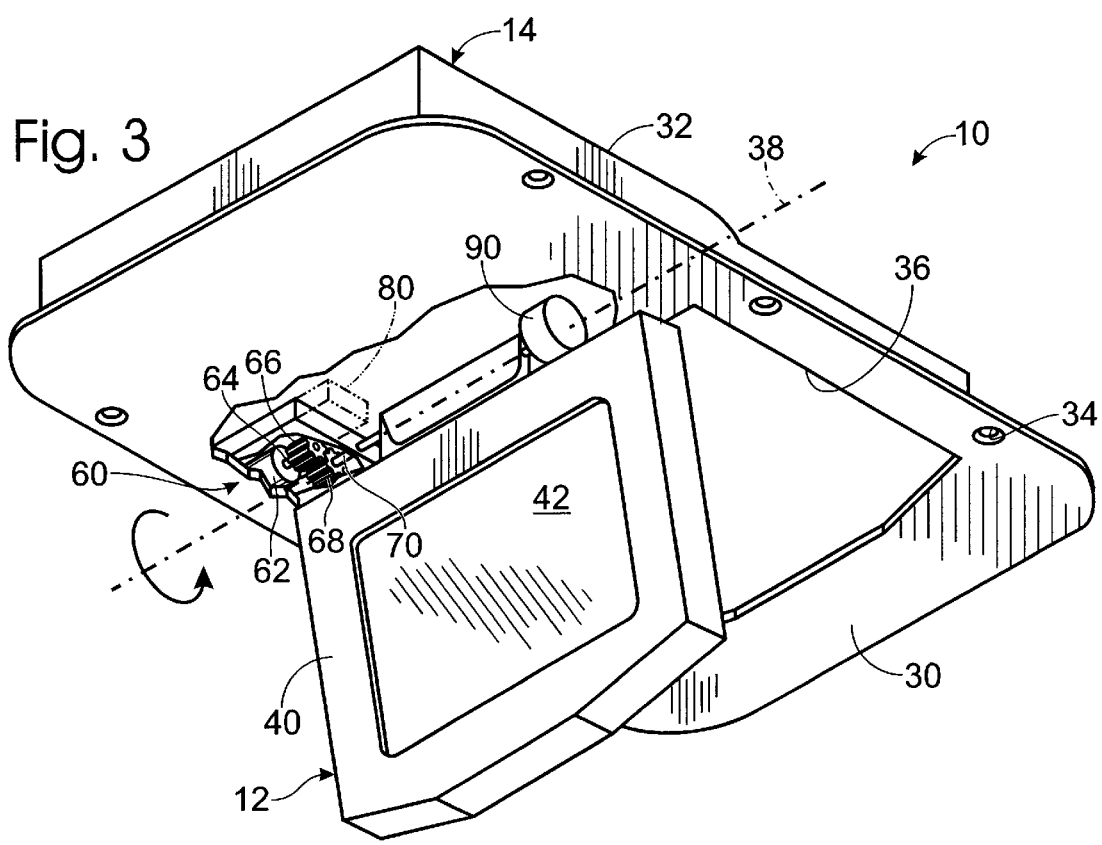
FIG. 3 is a partially fragmented isometric view of the embodiment of FIG. 1 with the monitor in the deployed position.

FIGS. 2 and 3 depict display monitor system 10 in more detail. As these figures show, base 14 includes a bottom portion 30, and a mechanical and electronics housing 32 extending upwardly from bottom portion 30. Bottom portion 30 forms a lower surface of base 14, and includes a plurality of mounting holes 34 adapted to receive fasteners for mounting base 14 to ceiling 20. Any suitable fastening mechanism (e.g. screws) may be used to attach base 14 to ceiling 20. Furthermore, base 14 may be attached to ceiling 20 with an adjustable method, such as that disclosed in U.S. patent application Ser. No. 09/626,210 for a VEHICLE DISPLAY MONITOR SYSTEM, filed on Jul. 26, 2000, which is hereby incorporated by reference.

Base 14 is generally designed to have a low profile in a vehicle so that the base interferes minimally with the actions of vehicle occupants in passenger compartment 18. Base 14, for example, may be configured to extend only partially, if at all, into passenger compartment 18. In the depicted embodiment, base 14 is configured to fit substantially flush with a headliner (not shown) in the vehicle. In fact, bottom portion 30 of base 14 is configured to rest against the headliner adjacent a hole in the headliner through which monitor 12 extends when deployed. A covering or shroud (not shown) may be provided to cover any portion of base 14 that extends through the vehicle headliner, but is not necessary.

When in the stowed position, monitor 12 may nest partially or fully in a recess 36 formed in base 14, as shown in FIG. 2. Positioning monitor 12 in recess 36 when in the stowed position helps to reduce the intrusion of display monitor system 10 into passenger compartment 18 while in the stowed position, and also helps to protect monitor 12 from damage while stowed. In the depicted embodiment, monitor 12 is configured to retract fully into recess 36 when stowed, thus positioning monitor 12 flush with, or even recessed into, the vehicle headliner when stowed. However, monitor 12 may also retract only partially into base 14 when stowed, or may simply rest against base 14 (or the vehicle ceiling).

Monitor 12 may be any type of monitor known in the art for use in vehicles, and is typically a flat panel display (FPD) monitor. Monitor 12 includes a monitor housing 40 with a viewing surface 42 for displaying an image to a passenger.

As mentioned above, monitor 12 is movably coupled to base 14 so that it may be moved between a stowed position and a deployed position. Monitor 12 may be movably coupled to base 14 with any suitable mechanism. In the depicted embodiment, however, monitor 12 is pivotally coupled to base 14 so that it may be pivoted about an axis 38 between the stowed and deployed positions. Furthermore, monitor 12 may have a continuous range of possible deployed positions so that the angle of the monitor can be adjusted to suit passengers of different heights. While in the depicted embodiment monitor 12 is stowed with viewing surface 42 facing down into the vehicle passenger compartment, monitor 12 may also be stowed with the screen 40 facing up toward ceiling 20 of vehicle 16, or in any other desired orientation.

In accordance with the present invention, monitor 12 is operatively connected to a driving mechanism for driving monitor 12 between the stowed and deployed positions. FIG. 3 shows one embodiment of a suitable driving mechanism 60 for driving the monitor between positions. Driving mechanism 60 includes a motor 62 to power movement of the screen between positions. Any suitable motor may be used. Typically, motor 62 is an electric step motor, and is powered by the vehicle battery.

Motor 62 includes a drive shaft 64, to which a drive shaft gear 66 is attached. Drive shaft gear 66 is engaged with an axle gear 68, which is in turn coupled to an axle 70 that is fixed to monitor 12. Thus, when motor 62 is operated, its motion is transferred to axle 70 and thus turns monitor 12. Axle 70 is fixed to monitor 12 via any suitable cooperative mechanism, and can be fixed to monitor 12 at any suitable location on monitor 12. In the depicted embodiment, axle 70 is fixed to monitor 12 adjacent the top edge of monitor 12. Axle 70 is also coupled to base 14 to support monitor 12 on base 14.

Motor 62 is in communication with a controller, shown schematically at 80 in FIG. 3, for controlling the movement of monitor 12. Controller 80 may be configured to direct motor 62 to move monitor 12 upon receiving various selected inputs. For example, controller 80 may be in communication with a user-controllable external device, such as a control panel or remote control, to allow a user to deploy, stow or adjust the position of monitor 12 manually. Furthermore, controller 80 is adapted to detect changes in the status of the vehicle, or various vehicle components. Accordingly, when a predetermined change in the status of the vehicle, or of a particular component of the vehicle, is detected, the monitor may be moved to a correspondingly desired position to reduce interference with an occupant's use of the vehicle.

One vehicle component that may be monitored for status changes is a vehicle door. Each door in the vehicle has an open status and a closed status. Typically, the vehicle will have a corresponding status indicator that detects the status of the door and indicates the status with a suitable mechanism, such as a dashboard light. Depending upon the location of display monitor system 10 in the vehicle, monitor 12 may interfere with passengers entering or exiting the vehicle through various doors in the vehicle when in the deployed position. To compensate for this, controller 80 may be configured to detect a change in the status of one or more vehicle doors adjacent display monitor system 10 from closed to open in any suitable manner, such as by detecting the status indicator, and when such a status change is detected, to move screen 12 to a less obstructive position (e.g. the stowed position).

Another vehicle component that may be monitored for status changes is the automobile transmission. While driving in a forward gear, the driver of a vehicle with a passenger compartment-mounted display monitor will not ordinarily be distracted by the monitor, as the display monitor system will typically be mounted at a location behind the driver, and the monitor will not ordinarily block much of the view area of the rear view mirror. However, when a driver is operating the vehicle in reverse, the driver may wish to stow the monitor so as to further reduce obstruction of the drivers' rearward view. Thus, controller 80 could monitor the vehicle transmission for a change in the transmission status to a reverse gear (or "reverse gear status"). The controller typically monitors the transmission status by monitoring a suitable transmission status indicator. The vehicle may have one or more transmission status indicators. For example, the vehicle may have a dashboard light that indicates when the reverse gear is engaged, or may have backing lights that are illuminated only when the vehicle is in the reverse gear. Upon detecting a change to a reverse gear status, controller 80 may then direct motor 62 to move monitor 12 to the stowed position so that the driver's view out the rear of the vehicle is relatively unimpeded by monitor 12 while the car is in reverse.

Yet another vehicle component that could be monitored by controller 80 for a change in status is the vehicle ignition switch. This is because it is often desirable to stow monitor 12 while the car is not being used. First, monitor 12 is protected from damage from passengers entering or exiting the car, or from objects being put into or removed from the car, while in the stowed position. Second, the presence of monitor 12 in the passenger compartment may make the vehicle a more attractive target for thieves. When monitor 12 is stowed, it is less visible from outside the vehicle, and thus may reduce the susceptibility of the vehicle or display monitor system 10 to theft.

Generally the vehicle ignition switch will include an open switch status and a closed switch status, although many vehicles have ignition switches with multiple positions, such as an auxiliary position in which power is supplied to various vehicle systems while the motor is not running. The open switch status corresponds to the status wherein the car engine is turned off, and the closed switch status corresponds to the status wherein the car engine is powered. Typically, the vehicle will have a status indicator that indicates whether the ignition switch is in the open or closed position. Controller 80 may monitor the vehicle ignition switch, for example by monitoring the status indicator, for a change in status from the closed switch status to the open switch status. When this change in status is detected, controller 80 may move monitor 12 toward, or to, the stowed position so that the monitor is stowed when the vehicle is turned off.

In addition to moving monitor 12 to the stowed position upon detecting a predetermined change in vehicle status, controller 80 may also be configured to move monitor 12 back to its initial position (the position of monitor 12 immediately before it was moved to the stowed position), or to a default deployed position, upon detecting a converse predetermined change in the status of the component.

For example, once the door of the vehicle has been closed, the passenger most likely has finished entering or exiting the automobile, and thus the condition that gave rise to the need for stowing monitor 12 has passed. Similarly, once the car has been turned on or taken out of reverse, the conditions that gave rise to the need for stowing monitor 12 have also passed. Therefore, the controller may be configured to detect a change in the door status from open to closed, the ignition switch status from open to closed, or the transmission status from reverse gear to non-reverse gear, and to move monitor 12 back to the initial position upon detecting the change.

In order for the controller to be able to return monitor 12 to its initial position after detecting the converse predetermined change in status of a component, controller 12 must be able to detect the initial position before moving the monitor to the stowed position. To provide for this capability, display monitor system 10 includes an encoder 90 operatively coupled to monitor 12 to detect movement of monitor 12 and to encode the position of monitor 12. Any suitable encoder for encoding rotational motion may be used. In the depicted embodiment, an optical encoder 90 is used. Optical encoder 90 encodes the position of monitor 12 by measuring light pulses generated by rotating a slotted wheel in front of a light source.

Figure 4:
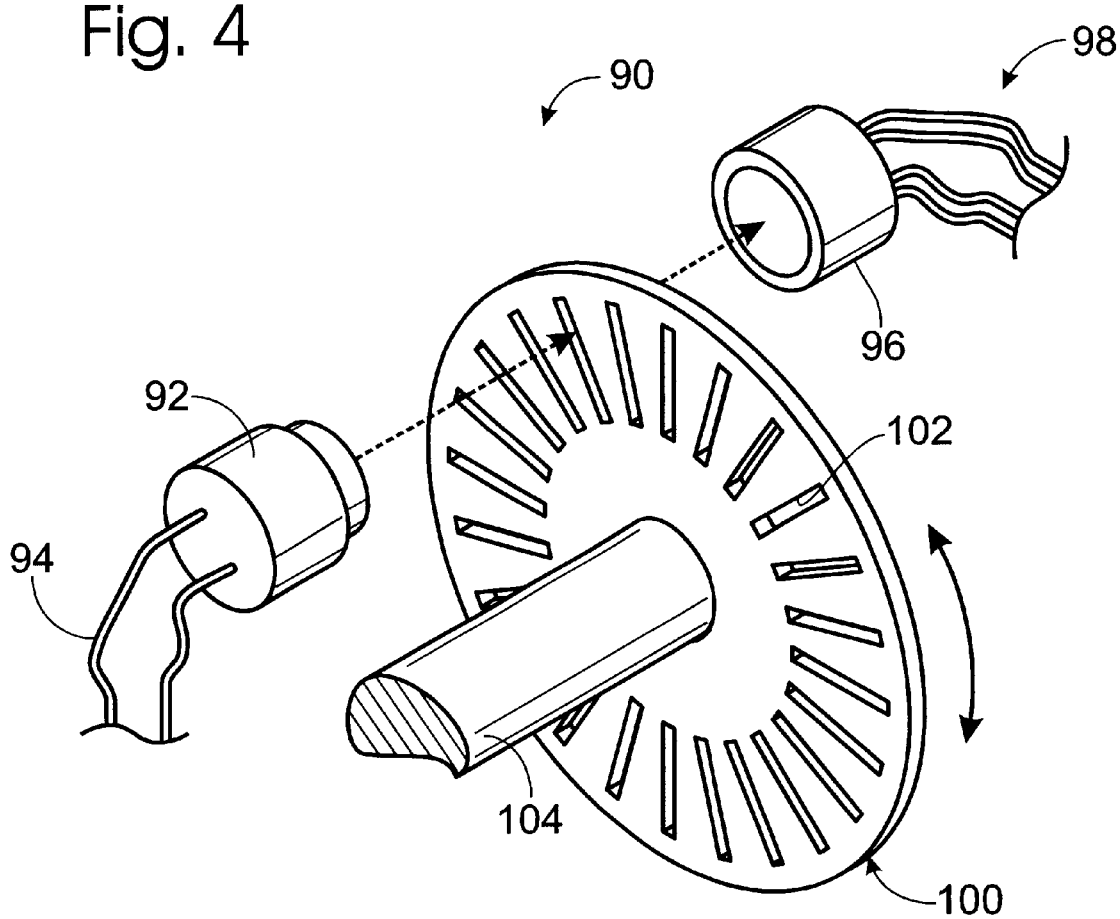
FIG. 4 is an isometric view of a source, a detector and a slotted wheel of an optical encoder of the embodiment of FIG. 1.

FIG. 4 illustrates the operative components of an exemplary optical encoder suitable for use with display monitor system 10. Optical encoder 90 includes a light source 92 with a plurality of leads 94 for connecting light source to a power supply, and a detector 96 with a plurality of leads 98 for coupling detector 96 to controller 80 and to a power supply. Detector 96 is in optical alignment with source 92 so that detector 96 can detect light from source 92. Optical encoder 90 also includes a wheel 100 with a plurality of light apertures 102 disposed between source 92 and detector 96.

Wheel 100 is opaque so that it does not pass light from source 92 to detector 96 unless a slot is rotated between source 92 and detector 96. Wheel 100 includes a shaft 104 coupled to monitor 12 so that wheel 100 is turned as monitor 12 is pivoted. Thus, as monitor 12 pivots, wheel 100 turns, causing light apertures 102 to pass sequentially between source 92 and detector 96 and pulses of light to reach detector 96. Controller 80 may then count the number of pulses and detect the direction of motor rotation to determine the position of monitor 12.

Controller 80 may be configured to detect the status of a desired vehicle component or components in any suitable fashion. As described above, in one embodiment of the invention, controller 80 is coupled to a vehicle status indicator to detect a change in status of a vehicle component. Many passenger vehicles are equipped with various vehicle status indicator circuits to indicate the status of vehicle components to the vehicle operator. For example, most passenger cars have indicator systems that warns a driver when a door is opened, when the ignition is turned off, or when the car is in reverse. These indicators generally operate by illuminating an indicator light on the vehicle dashboard, indicating a particular status condition. Furthermore, many cars have other systems that respond to changes in vehicle status, and thus also function as status indicators. For example, most automobiles have circuits that automatically illuminate backing lights when the automobile is put into reverse.

Each of these vehicle status indicators generally has at least two states: an indicator-active state and an indicator-inactive state. For example, when the vehicular component has a status such as a closed door status, an ignition switch closed status or a non-reverse gear status, the vehicle status indicator generally has an inactive state in which an indicator light is not illuminated or the backing lights are not illuminated. Likewise, when the component has the opposite status, such as an open door status, an ignition switch open status or a reverse gear status, the vehicle status indicator has an active state, in which the indicator light is illuminated or the backing lights are illuminated.

Figure 5:
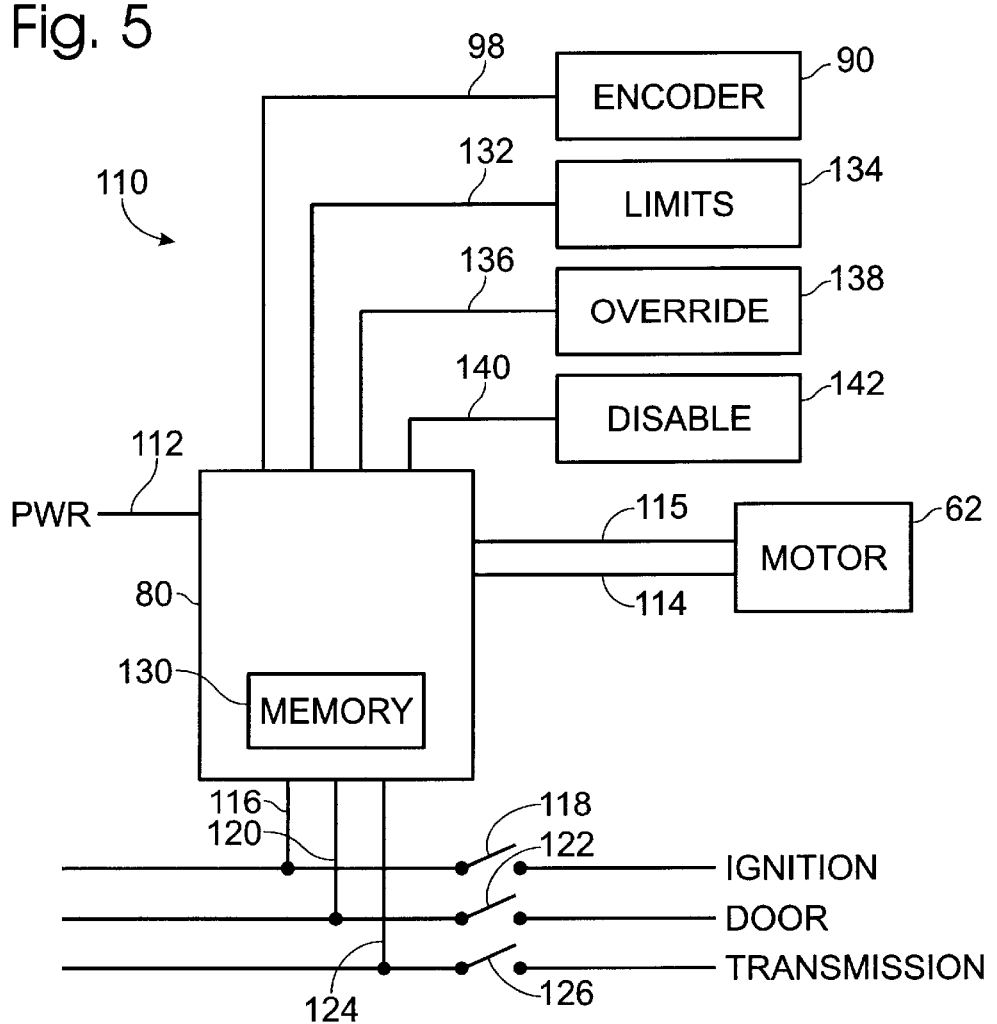
FIG. 5 is a schematic diagram of a control system suitable for controlling movement of the monitor of the embodiment of FIG. 1.

Controller 80 may take advantage of the presence of these existing vehicle status indicators by directly monitoring the state of the vehicle status indicator to detect changes in the status of the desired components. FIG. 5 shows generally at 110 an electrical schematic diagram of a suitable monitor movement control system for detecting changes in the vehicle status indicator and moving monitor 12 when changes are detected. As shown in the figure, controller 80 has a power supply line 112, one or more outputs to motor 62, and a plurality of inputs for various motor control signals. In the depicted embodiment, controller 80 has two outputs 114, 115 to motor 62. Output 114 allows controller 80 to control the run/stop status of motor 62, and output 115 allows controller 80 to control the direction in which motor 62 turns.

As shown in FIG. 5, controller 80 can have connections to a plurality of vehicle status indicators, if desired. In the depicted embodiment, controller 80 has a first connection 116 to an ignition status indicator 118, a second connection 120 to a door status indicator 122, and a third connection 124 to a transmission status indicator 126. The status indicators are each depicted as a switch to reflect the two possible states of each indicator. However, it will be appreciated that a status indicator may also have more than two possible states, and the monitor may be moved between more than two positions without departing from the scope of the present invention.

Controller 80 also has an input from one of leads 98 coupled to encoder 90. Input from lead 98 allows controller 80 to keep track of the pulses from encoder 90 to determine the magnitude of the movement of monitor 12. The direction in which monitor 12 moves can be detected from other signals, such as the motor direction output 115, or can be from encoder 90 itself, which may require a second input from encoder 90. By receiving positional input from encoder 90, controller 80 is able to track the position of monitor 12.

Controller 80 includes memory 130 for storing the encoded position as an initial position so that monitor 12 can be moved back to the initial position when a corresponding change in the state of vehicle status indicator 118, 122 or 126 is detected. Memory 130 may be any suitable type of memory. In one embodiment of the invention, memory 130 is a non-volatile memory, such as EPROM, EEPROM or flash memory, so that the initial position of monitor 12 will not be lost in case of a vehicular power failure or when the vehicle is turned off.

Controller 80 may have other inputs as well. For example, it may be desirable to include an input 132 from one or more limit switches 134 in display monitor system 10 to prevent damage to either monitor 12 or motor 62 caused by motor 62 attempting to over-rotate monitor 12 in either direction. Typically, two limit switches 134 are provided in display monitor system 10; one to indicate a maximum deployed position, and the other to indicate the stowed position of monitor 12. Other limit switches, such as a switch for a minimum deployed position, may also be provided if desired.

Controller 80 may also include an input 136 from an override control 138. Override control 138 allows a user to disengage monitor 12 from motor 62 to allow the manual repositioning of monitor 12. Override control 138 may provide for this capability in any suitable manner, such as by controlling the engagement or disengagement of a clutch mechanism (not shown) that couples monitor 12 to motor 62. Alternatively, override control may be a manually operated mechanical clutch mechanism, and thus not include an input into controller 80.

Controller 80 may also include an input 140 from a disable switch 142. Disable switch 142 allows a user selectively to turn off or on the automatic stowing and deployment mechanism of the present invention. Disable switch 142 may allow a user to turn off the response of controller 80 to any or all of vehicle status indicators 118, 122 and 126. Furthermore, more than one disable switch may be provided to perform these functions without departing from the scope of the invention.

FIG. 6 shows generally at 200 an example of a methodology that provides for the automatic deployment or stowing of monitor 12 upon detecting a change in status of a vehicle component. While monitor 12 is in the initial position at 202 (typically a deployed position), controller 80 periodically reviews the status indicators for the door, the transmission and the ignition switch to detect a change to door open status, reverse gear status, or open ignition switch status (respectively) at 204. Once a change in status is detected, controller 80 may then determine whether the monitor is within a predetermined positional range at 206. The predetermined range may extend through the entire range of monitor positions, or may extend only through a more limited range of positions.

If the position of monitor 12 is within the positional range, then the monitor position is encoded by encoder 90 at 208, the encoded position is stored in memory at 210, and the monitor is moved to the desired position, such as the stowed position, at 212. At this point, controller 80 then periodically reviews the status of the door, ignition switch and transmission to detect a change to closed door status, non-reverse gear status or closed ignition switch status at 214. Once one of these status changes is detected, monitor 12 is then moved back to the encoded position at 216, and controller 80 again periodically reviews the status of the vehicle components for the changes in status shown at 204.

Alternatively, if monitor 12 is in a position outside of the predetermined positional range at 206, then the position is not encoded or stored. Instead, the monitor is simply moved to the stowed position at 218, and controller 80 then periodically reviews the status of the door, ignition switch and transmission to detect for changes in status to a closed door, closed switch or non-reverse status. When a converse change in status is detected, controller 80 then moves monitor 12 to a default position at 222. The default position may be any desired position. Examples of possible default positions include a fully deployed position, a minimally deployed position, a halfway deployed position, or even the stowed position, in which case the monitor would remain stowed when the second change in status is detected.

It is to be appreciated that controller 80 need not have to determine whether monitor 12 is in an encodable range at 206. Instead, the encodable range may extend through the entire movable range of monitor 12, in which case all monitor positions would be in range and there may be no default position at all. Furthermore, the position of monitor 12 may not be encoded at all. In this case, monitor 12 may simply be left in the stowed position, or may always be moved to a default position, when a change to a closed door, closed switch or non-reverse status is detected.

While the present invention has been particularly shown and described with reference to the foregoing embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

I claim:

1. In a vehicle having an interior and a vehicle status indicator with a changeable state, a display monitor system comprising:

a monitor having a viewing surface, wherein the monitor is movable between a deployed position and a stowed position;

a motor drivingly coupled to the monitor to move the monitor between the stowed position and the deployed position; and a controller operatively connected to the motor for controlling the motor, wherein the controller is adapted to detect a change in the state of the vehicle status indicator and to signal the motor to move the monitor to a predetermined position corresponding to the detected change in the state, wherein the vehicle status indicator indicates a status of a door of the vehicle, and wherein the status of the door includes an open door status and a closed door status.

2. The display monitor system of claim 1, wherein the controller signals the motor to move the monitor to the stowed position when a change in the door status from closed door status to open door status is detected.

3. The display monitor system of claim 1, further comprising an encoder in communication with the controller for encoding an encoded position of the monitor and communicating the encoded position to the controller.

4. The display monitor system of claim 3, the controller including memory, wherein, upon detecting a first predetermined change in state of the vehicle status indicator, the controller stores the encoded position of the monitor in memory and signals the motor to move the monitor to the stowed position, and wherein, upon detecting a second change in the state of the vehicle status indicator, the controller signals the motor to move the monitor back to the encoded position.

5. The display monitor system of claim 4, wherein the vehicle status indicator-active state to the indicator-inactive state.

6. The display monitor system of claim 4, wherein the memory is nonvolatile.

7. The display monitor system of claim 3, wherein the encoder is an optical encoder.

8. The display monitor system of claim 1, wherein the monitor is pivotally coupled to the interior.

9. The display monitor system of claim 1, wherein the interior includes a ceiling, the monitor being mounted to the ceiling.

10. The display monitor system of claim 1, further comprising a base to couple the monitor to the interior.

11. The display monitor system of claim 10, wherein the base includes a recess, and wherein the monitor is positioned at least partially within the recess when in the stowed position.

12. The display monitor system of claim 1, wherein the deployed position is selectable from a range of possible deployed positions.

13. The display monitor system of claim 1, wherein the controller includes an override mechanism adapted to allow an occupant of the vehicle to selectively bypass the motor from moving the monitor when a change in the vehicle status indicator state is detected.

14. A vehicle comprising:

a ceiling;

an occupant-controllable component with a changeable status;

a monitor pivotally coupled to the ceiling, the monitor being pivotal between a first position and a second position;

a motor coupled to the monitor configured to drive movement of the monitor between the first position and the second position;

a door;

a vehicle status indicator with a changeable state for indicating the status of the occupant-controllable component, the vehicle status indicator including an open door state indicating an open status of the vehicle door and a closed door state indicating a closed status of the vehicle door, the change in the state corresponding to a change from the closed door state to the open door state; and a controller for controlling the motor, wherein the controller is adapted to monitor the status of the occupant-controllable component, to detect a change in the state of the vehicle status indicator, and upon detecting a change in the status of the occupant-controllable component, to direct the motor to move the monitor to a position that facilitates use of the vehicle by the occupant.

15. The vehicle of claim 14, wherein the controller, upon detecting a change in status of the occupant-controllable component from a first status to a second status, stores the position of the monitor at the time the change in status was detected as an initial position.

16. The vehicle of claim 15, wherein the controller directs the motor to move the monitor to the position that facilitates use of the vehicle by the occupant after storing the initial position of the monitor.

17. The vehicle of claim 15, wherein the controller is adapted, upon detecting a change in status from the second status to the first status, to direct the motor to return the monitor to the initial position.

18. A method of facilitating use of an vehicle by an occupant of a passenger compartment of the vehicle, the vehicle including a vehicle status indicator with a changeable state, the passenger compartment including a display monitor system having a monitor that is movable between a plurality of positions, the plurality of positions including a stowed position, the method comprising:

periodically reviewing the state of the vehicle status indicator, wherein the vehicle status indicator indicates a status of a door of the vehicle, the status of the door including an open door status and a closed door status;

detecting a first predetermined change in the state of the vehicle status indicator, wherein detecting a first predetermined change in the state includes detecting a change in the state corresponding to a change from the closed door status to the open door status;

upon detecting the first predetermined change in the state of the vehicle status indicator, moving the monitor to a first predetermined position that facilitates use of the vehicle by the occupant while the vehicle is in the state indicated by the vehicle status indicator;

detecting a second predetermined change in the state of the vehicle status indicator; and upon detecting the second predetermined change in the state of the vehicle status indicator, moving the monitor to a second predetermined position.

19. The method of claim 18, further comprising encoding the position of the monitor with an encoder to form an encoded position before detecting the first predetermined change in the state.

20. The method of claim 19, further comprising saving the encoded position to form a saved position after detecting the first predetermined change in the state and before moving the monitor to the first predetermined position.

21. The method of claim 20, wherein moving the monitor to the second predetermined position after detecting a second predetermined change in the state includes moving the monitor to the saved position after detecting the second predetermined change in state.

22. The method of claim 18, wherein moving the monitor to the first predetermined position to facilitate use of the vehicle by the occupant includes moving the monitor to the stowed position.

23. The method of claim 18, wherein detecting a second predetermined change in the state includes detecting a change in the state corresponding to a change from the open door status to the closed door status.

* * * * *